Patented Jan. 1, 1935

1,986,341

UNITED STATES PATENT OFFICE 1,986,341

COMPOSITION OF MATTER AND PROCESS OF PREPARING SAME

Roger B. Hill, Peabody, Mass., assignor to Brown Company, Berlin, N. H., a corporation of Maine No Drawing. Application May 17, 1932, Serial No. 611,927

12 Claims. (Cl. 106—1)

The subject of this invention is a composition of matter into which cellulose enters as a principal raw material. While not restricted thereto, the composition is intended for use in the field of rubber compounds. The present invention also relates to the process of preparing the composition.

In making rubber compounds, it is sometimes the practice to use finely divided or powdered fillers which can be readily and uniformly worked or milled into the rubber along with such rubber-compounding agents as sulphur, accelerators of vulcanization, or the like, on the usual rubber mills or so-called internal rubber mixers. I have found that powdered cellulose is a valuable filler in rubber compounds, particularly that kind of powdered cellulose which is produced from cellulose fiber of the nature of preliberated wood pulp. From a chemical as well as physical standpoint, such powdered cellulose is an attractive filler for rubber compounds, because of its inertness in such compounds and its stability, which arises from the fact that the process of fiber liberation has removed most of the ligneous matter, less-resistant cellulose, resins, and other unstable components associated with the raw wood. While cellulose fibers, such as sulphite, kraft, or other chemical wood pulps lend themselves to conversion into a powder of far greater stability than the raw wood, nevertheless it is preferable to use refined wood pulps of high alpha cellulose content, cotton fiber, or other refined pulps, as the source of the powdered cellulose. For instance, sulphite or kraft pulp which has been refined by processes now well known in the art to an alpha cellulose content of about 94% or greater, yields powders of excellent stability.

One of the problems arising from the use of cellulose powder of the foregoing character in rubber compounds is the difficulty of incorporating the powder uniformly throughout the rubber mass. Indeed, the powder particles even when of 200 mesh fineness tend to gather into aggregates or hard pellets in the rubber batch undergoing the milling or mixing operation. I have found that this difficulty may be overcome if a suitable lubricant is initially associated with the powdered cellulose in such a way that the powder particles are surfaced with the lubricant. The lubricant employed for this purpose is preferably one which is serviceable and valuable as a rubber-compounding agent. Various lubricants, like paraffin and rosin, might be employed in treating the cellulose powder before it is incorporated into the rubber, but inasmuch as carnauba wax is more generally desired as a rubber-compounding agent and can be applied with eminent success as a coating or lubricating film over the cellulose particles, I prefer to use this wax. Only a relatively small proportion of carnauba wax, say, ¼% to 2%, based on the weight of powdered cellulose, serves to impart the properties desired in the preparation of rubber compounds. Other waxes or wax-like materials may be used in place of carnauba wax, for instance, stearic acid, zinc stearate, Montan wax, ceresin, or other mineral, vegetable, or synthetic wax, preferably of a hard nature.

There are various ways in which one may treat the cellulose powder to produce the composition of the present invention. One method which is simple and can be practised to good advantage is as follows. A wood pulp, preferably one of high alpha cellulose content, can be reduced to the desired pulverulent state, as in a ball mill. Such mechanical pulverization is preferably performed with the pulp in a perfectly dry condition, as this condition fosters the grinding of the pulp fibers into fine particles. The resulting cellulose powder may be of a particle size of, say, from 40 to 200 or finer mesh, depending upon the characteristics desired in the rubber compound. To the powdered cellulose in the ball mill may be added, say, about 1% carnauba wax, based on the weight of dry fiber. The wax may be added as a powder or in lumps, in which case the grinding is continued for about one-half hour to one hour, in order to secure the desired distribution over the surfaces of the cellulose particles. It might be supposed that the product would be a mixture of pulverized cellulose and free, powdered wax, but, on the contrary, no free wax is observable in the product. The wax is evidently distributed substantially in entirety over the surfaces of the cellulose particles. Such a composition can readily be worked or milled into a rubber compound in the customary manner so as to become disseminated or dispersed substantially uniformly throughout the compound. This result is doubtless had on account of the lubricating effect of the wax films or coatings on the cellulose particles, permitting the particles to segregate freely from one another and to become dispersed throughout the rubber mass. When the wax or equivalent lubricant is omitted, the rough, broken surfaces of the cellulose particles, which are clearly observable under the microscope, evidently tend to lock with one another and thus to give rise to aggregates or pellets.

The addition of the wax to the cellulose is preferably made, as already described, after the cellulose has been reduced to the desired particle size, since the wax would otherwise perform its lubricating function and tend to inhibit pulverization of the cellulose. So, too, it is distinctly preferable that the wax or other lubricant be properly distributed throughout the cellulose powder before the powder is incorporated into the rubber, for the same results cannot be secured by using a plain cellulose powder and adding a suitable lubricant therewith to the rubber at the time of compounding.

A cellulose powder in properly pretreated condition for incorporation into rubber compounds may be realized through another method. Assuming that a wax such as carnauba or other lubricant which lends itself to dispersion in water is to be used, the procedure may be substantially as follows. The dry, powdered cellulose of the requisite particle size is mixed with water to form an aqueous suspension of a flowable consistency. To this suspension is then added an aqueous dispersion of the wax or other lubricant, e. g., an aqueous dispersion of Montan wax containing soap or other precipitable protective colloid for stabilizing the dispersion. The soap or other protective colloid may be destroyed as by the addition of alum or other well-known agent so as to cause a precipitation of the wax on the cellulose particles. The suspended cellulose particles containing wax precipitated thereon may then be separated from the aqueous suspending vehicle, as by filtration. The filtered mass is preferably washed, whereupon it is dried. The dried mass or cake crumbles easily into a powder which is eminently satisfactory for compounding with rubber.

In those instances when it is desired to produce a colored composition, the cellulose fiber used as the starting material may be dyed before it is reduced to a pulverulent condition. When a wax is employed as the lubricant for the cellulose particles, it may be treated with a dye which is soluble therein, before it is added to the cellulose powder as hereinbefore described. When the composition is prepared by suspending the cellulose powder in water and then adding an aqueous dispersion of wax or other lubricant, the desired coloration can be effected by adding a water-soluble dye to the aqueous suspending medium. The dye is preferably added before the dispersion of wax or other lubricant, as well as before the alum or other precipitant. I need not herein describe the preparation of aqueous dispersions of lubricants, such as carnauba wax, paraffin, or their equivalents, since these are now well known in the art. Nor need I mention specifically such water-soluble or wax-soluble dyes as I might employ, since these are available on the open market and are in current use.

The cellulose powders comprehended by the present invention may be derived from any suitable cellulosic source, although, as already indicated, I prefer to use a stable cellulose fiber as raw material. The fiber may, if desired, be treated with suitable chemicals designed to facilitate pulverization. For instance, the fiber may be mercerized or treated with suitable acid or other solutions under conditions conducive to its embrittlement.

I claim:

1. A process which comprises mechanically reducing cellulose pulp to a mass of substantially unhydrated particles substantially all of which are of a particle size not greater than 40 to 200 mesh, and intimately mixing a waxy material in finely divided but undissolved and unfused state with such mass of essentially only fine cellulose particles.

2. A process which comprises mechanically reducing cellulose pulp to a mass of substantially unhydrated particles substantially all of which are of a particle size not greater than 40 to 200 mesh, and intimately mixing under impact action a hard, waxy material in finely divided but undissolved and unfused state with such mass of essentially only fine cellulose particles.

3. A process which comprises mechanically reducing cellulose pulp to a mass of substantially unhydrated particles substantially all of which are of a particle size not greater than 40 to 200 mesh, and intimately mixing about 1% of a hard, waxy material in finely divided but undissolved and unfused state with such mass of essentially only fine cellulose particles until said material is practically completely absorbed by distribution over the surfaces of the cellulose particles.

4. A process which comprises mechanically reducing cellulose pulp to a mass of substantially unhydrated particles substantially all of which are of a particle size not greater than 40 to 200 mesh, mixing an aqueous dispersion of discrete waxy particles with such mass of essentially only fine cellulose particles, and dewatering the mixture to form a mass that crumbles into powder.

5. A process which comprises mechanically reducing cellulose pulp to a mass of substantially unhydrated particles substantially all of which are of a particle size not greater than 40 to 200 mesh, mixing an aqueous dispersion of discrete waxy particles with such mass of essentially only fine cellulose particles, precipitating the waxy particles on the cellulose particles, and dewatering the mixture to form a mass that crumbles into powder.

6. A process which comprises mechanically reducing cellulose pulp to a mass of substantially unhydrated particles substantially all of which are of a particle size not greater than 40 to 200 mesh, mixing an aqueous dispersion of discrete waxy particles with such mass of essentially only fine cellulose particles, precipitating the waxy particles on the cellulose particles, filtering out the cellulose particles, washing the filtered mass, and drying it to form a product that crumbles into powder.

7. A mass of substantially unhydrated cellulose particles substantially all of which are of a particle size not greater than 40 to 200 mesh associated with waxy material distributed in an unfused, discontinuous condition over the surfaces of said particles, said mass crumbling readily into a powder-like condition.

8. A mass of substantially unhydrated cellulose particles substantially all of which are of a particle size not greater than 40 to 200 mesh associated with hard wax distributed in an unfused, discontinuous condition over the surfaces of said particles, said mass crumbling readily into a powder-like condition.

9. A mass of substantially unhydrated cellulose particles substantially all of which are of a particle size not greater than 40 to 200 mesh associated with about 1% of Montan wax distributed in an unfused, discontinuous condition practically in entirety over the surfaces of said particles, said mass crumbling readily into a powder-like condition.

10. A mass of mechanically powdered, substantially unhydrated cellulose pulp substantially all of whose particles are of a size not greater than 40 to 200 mesh associated with waxy material distributed in an unfused, discontinuous condition over the surfaces of said particles, said mass crumbling readily into a powder-like condition.

11. A mass of mechanically powdered, substantially unhydrated cellulose pulp of an alpha cellulose content of at least about 94%, substantially all of whose particles are of a size not greater than 40 to 200 mesh, associated with waxy material distributed in an unfused, discontinuous condition over the surfaces of said particles, said mass crumbling readily into a powder-like condition.

12. A process which comprises reducing cellulose pulp under impact action to a mass of substantially unhydrated particles, substantially all of which are of a particle size not greater than 40 to 200 mesh, and then under similar action mixing hard waxy material in undissolved and unfused state in the amount of about ¼% to 2% with such mass of essentially only fine cellulose particles.

ROGER B. HILL.